Feb. 5, 1929.
C. E. SUMMERS
1,701,396
VIBRATION INSULATING MOUNTING
Filed Aug. 23, 1926      2 Sheets-Sheet 1
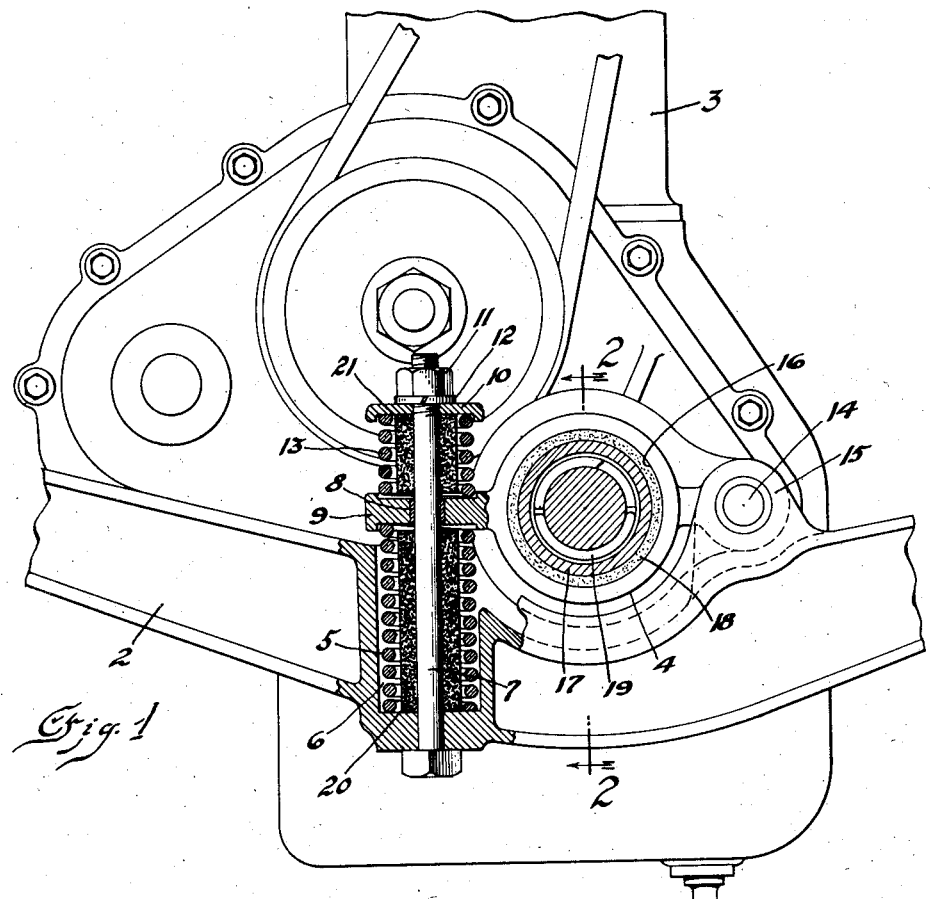
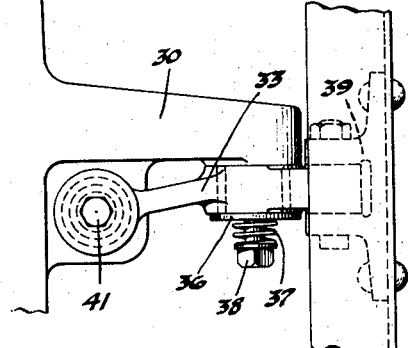
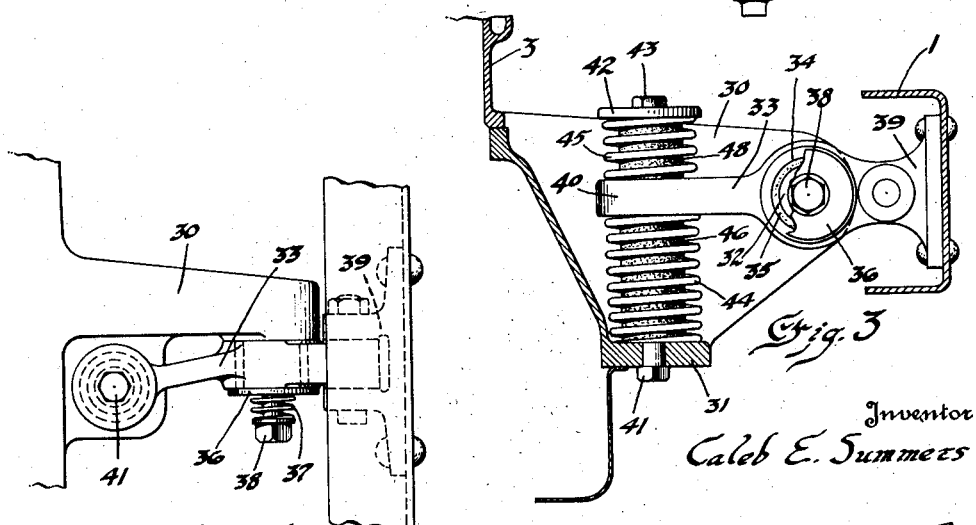
Inventor
Caleb E. Summers
By Blackmore, Spencer & Flint
Attorneys.

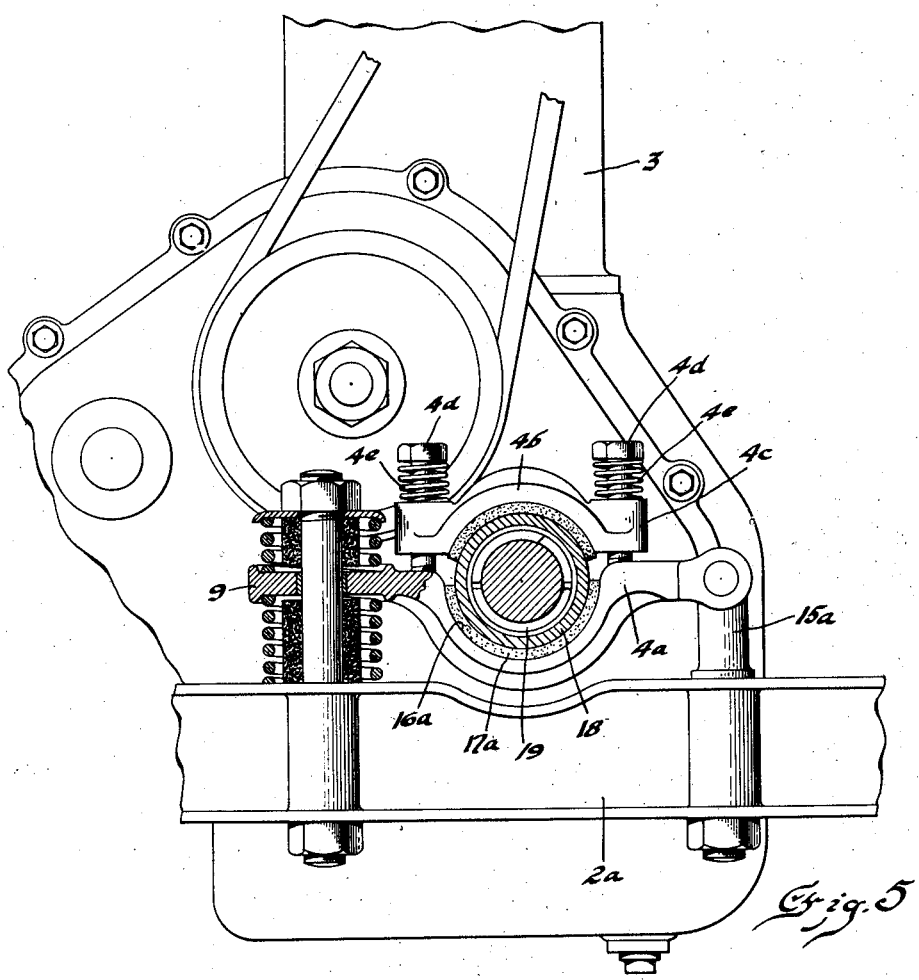
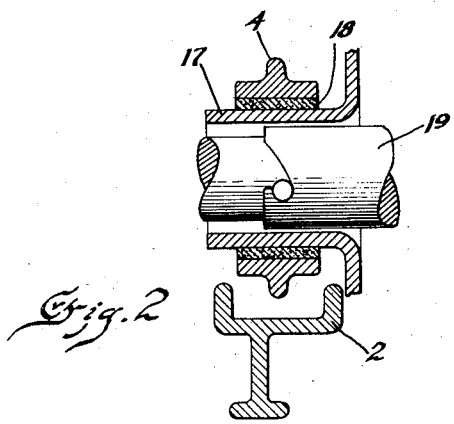

Patented Feb. 5, 1929.

1,701,396

UNITED STATES PATENT OFFICE.

CALEB E. SUMMERS, OF DETROIT, MICHIGAN, ASSIGNOR TO GENERAL MOTORS RESEARCH CORPORATION, OF DETROIT, MICHIGAN, A CORPORATION OF DELAWARE.

VIBRATION-INSULATING MOUNTING.

Application filed August 23, 1926. Serial No. 131,095.

This invention relates to means for mounting engines or other machines on their supporting frames or bases in such manner as to substantially prevent the transmission of vibrations, incident to the operation of the machines, to their supporting frames or bases. It contemplates particularly mounting engines on vehicle frames by means of interposed bearing elements having the property of insulating engine vibration from the frame.

Engines having crank shafts rotated by reciprocating pistons in common use in motor vehicles are subject to bodily vibrations of relatively small amplitude but relatively great intensity due to causes inherent in their operation.

All engines of the type named are subject to vibrations or oscillations about an axis coincident with the crank shaft axis, owing to so called torque reaction. Torque reaction, it is well recognized, is due to two causes. One of these causes is the pressure of expanding gas between the cylinder heads and pistons, which applies an equal and opposite force to the cylinder block and crank pins, thus tending to rotate the block around the crank shaft center in proportion to the angle of the crank pins with respect to the plane of the cylinder axes. This is effective at all speeds and tends to produce a very marked and intense bodily vibration of the engine. The other cause is commonly referred to as piston inertia, or the reactive force applied to the revolving crank pins and cylinder block during the effort of a crank pin to accelerate the piston after it has finished its stroke in one direction, and enters upon and continues its stroke in the opposite direction, the force of the revolving crank pin being then applied obliquely through the connecting rod and piston to the cylinder block, thus tending to rock the latter toward the right hand side if the crank shaft rotates clockwise, or toward the left if the crank shaft rotates counter clockwise. Torque reaction due to piston inertia is slight at low speeds and increases in proportion to increase of speed. The vibrations caused by it are of relatively small amplitude and intensity as compared with those produced by gas pressure.

Some engines, such as four cylinder engines having the cranks in one plane, angularly displaced 180°, in addition to bodily lateral vibrations around the crank shaft axis due to torque reaction are subject also to vibrations in the plane of the cylinder axes caused by unbalanced piston inertia. The resultant of the forces due to unbalanced piston inertia acts, in the usual motor vehicle engine, forward of the center of mass thus imparting to the engine a tendency to oscillate in the plane of the cylinder axes about an axis perpendicular to that plane somewhere near the rear of the engine.

Obviously, if the cylinders are arranged as in V-type engines the resultant of the unbalanced piston forces acting in the planes of the cylinders will be transversely applied forces.

Vehicle engines are also subject, of course, to fortuitous external forces that need to be reckoned with in the installation of vibration insulating mountings.

The described vibrations of relatively small amplitude incident to engines having upright cylinders in line though intense, may be quite effectively insulated from the frame by floating the engine on springs or other highly elastic bearing elements capable of sustaining the mass in what may be designated a normal gravitational position, assumed when only the force of gravitation acts upon the engine, but permitting the mass to move above and below that position substantially as the torque reaction or unbalanced inertia forces of the pistons urge it. As the amplitude of these vibrations is only a few thousandths of an inch, it will be apparent that, although a relatively tremendous resisting force would be required to stop the engine from vibration, the added pressure upon properly selected elastic bearing elements, resulting in only say 5 to 10 thousandths of an inch deflection of them, would be practically negligible at the frame.

So, an engine or other machine running idly at uniform speed could be effectively insulated from its supporting base from the view point of vibration by floating it upon elastic elements as described, provided the elastic elements were so selected that the natural frequency or period of vibration of the elastically floated mass did not synchronize with any harmonic movement of any of the moving parts of the machine. But it is obvious that a machine subject to varying loads, and operated through wide ranges of speed could not be floated in the manner described without other restraining influences, since there would be some point or points in the range of speed where resonance would occur between said one or more of the moving parts of the machine and the total elastically supported mass and thus augment the bodily vibrations of the mass to an unendurable extent. Furthermore, in the case of machines like motor vehicle engines, violent occasional external forces such as those due to road shocks, centrifugal action and the like, would be likely to tear the machine from its position, floating on the elastic elements, unless efficient preventive means were adopted.

Among the objects of this invention are, to float an engine on one or more elastic elements or otherwise elastically position it in such manner that the torque reaction or piston unbalance or both may vibrate the engine bodily, within the normal amplitude of the vibrations caused by these inherent forces, through the normal position of the mass, thus insulating them from the supporting frame, but to limit the vibratory movements to the plane or planes in which these forces act so as to guard against occasional sidewise acting forces such as lurching of a vehicle on sharp turns; to cause any excessive vibrations in those planes due to resonance to become dead beat; and to limit the free movement in the described planes so that occasional violent external forces such as may be caused by inequalities in the road cannot throw the engine much out of its normal position with respect to the supporting frame.

The stated objects are achieved by means hereinafter described, specific embodiments of which are illustrated in the accompanying drawings wherein like parts are indicated by like reference characters throughout the several views.

Referring to the drawings:

Fig. 1 is a front elevation, partly in section of a fragment of a motor vehicle engine and a front end mounting made in accordance with this invention;

Fig. 2 is a longitudinal section of a fragment taken on the plane represented by the line 2—2 of Fig. 1;

Fig. 3 is a transverse section through a fore and aft frame sill and fragment of an engine showing a rear side mounting;

Fig. 4 is a top plan view of the construction illustrated in Fig. 3;

Fig. 5 is a view similar to Fig. 1 illustrating a slight modification.

The drawings illustrate the invention applied to an automobile engine having three bearing points, one at the front and one at each side toward the rear. The left hand rear support, looking from front to rear, is not shown but may be a direct or any usual connection to the frame capable of permitting the slight yield necessary to allow the movement toward the right incident to torque reaction and the slight raising and lowering of the front end incident to piston unbalance. The front bearing shown is particularly adapted for four cylinder or other engines having a plurality of pistons the reciprocating movements of which are not balanced and therefore tends to impart a bodily up and down oscillation or vibration to the engine. The rear bearing element at the right (looking rearward) is adapted to insulate the vibrations caused by torque reaction in any reciprocating engine. An engine equipped with the two bearing elements illustrated is free to vibrate in response to piston unbalance and torque reaction, in planes at right angles to each other; it is restrained from movements in other directions as well as from vibrations in those planes of amplitude much in excess of those due to engine operation alone. Thus the engine is floated on elastic elements so that it may move freely as urged by forces inherent in its operation without transmitting its movements to the frame, motion otherwise being restrained or restricted by associated elements to be presently described.

In the drawings:

Numeral 1 indicates one of the usual fore and aft side sills of a motor vehicle and 2 a cross member connecting said longitudinal sills near their front ends; 3 designates an internal combustion or other engine mounted on said sills and cross bar by means of intermediate bearing elements to be described. The type of mount illustrated is commonly known as a three point engine support because the front of the engine is supported by an approximately central bearing element while the rear of the engine is supported by one bearing element on each side. The left hand bearing element (looking from front to rear) is not shown in the drawing and may be an ordinary direct connection or any usual means so long as it permits the very slight vibrational or oscillatory movements incident to normal engine operation. The right hand rear bearing element, according to this invention, is what is here termed an elastic element for floating the engine, which is illustrated in Fig. 3. The front supporting element according to this invention also floats the engine and is shown in Figs. 1 and 5, Fig. 5 illustrating a slight modification of the form shown in Fig. 1. In Fig. 1 numeral 4 indicates a carrier element attached to the engine, said carrier element resting upon an elastic element 5, here shown as a coil spring seated in a cavity formed in the cross bar 2. The spring 5 is placed under elastic compression by the weight of the engine applied to its upper end through the carrier 4. 7 indicates a bolt or pin extending through the cross bar 2 centrally of the cavity 6 and through a bushed opening 8 in the spring bearing part of the carrier 4. The upper end of bolt or pin 7 is provided with a spring abutment or cap 10 which is held in place adjustably by means of a nut 11 and lock washer 12. Between the spring bearing 9 of the carrier and the cap 10 is a spring 13 which bears upon the upper face of the part 9 of the carrier and may be placed under any compression found necessary. By means of the elastic elements described, namely the springs 5 and 13, the front end of the engine is floated in the position determined by the resistance of spring 5 and is permitted to vibrate or oscillate rather freely, although very slightly restrained, in the plane of the cylinder axes under the influence of unbalanced piston inertia forces.

In order that the engine may be prevented from moving bodily in a transverse direction as might otherwise occur under the influence, for example, of centrifugal force, should the vehicle lurch or turn a corner rapidly, the carrier 4 is fastened to the frame. In the embodiment shown, the carrier consists of an arm having at one end the spring bearing part 9 described and at the other end a pintle hinge connection at 14 to lugs 15 rigid with the cross bar 2 and rising therefrom toward the right hand side of the engine looking from front to rear.

Between the spring bearing part 9 and the pivot 14, carrier 4 is provided with a relatively large bore 16. A hollow boss or trunnion 17 formed on the engine base or crank case projects into the bore 16, there being a tubular piece 18 of friction material, such as brake lining, interposed between said boss and the wall of bore 16. The boss 17 may receive the forward end of the crank shaft 19. The described construction permits the engine to vibrate in the plane of the cylinder axes but prevents it from becoming displaced transversely under the influence of centrifugal forces; it also permits it to rock transversely. The pressure of the springs or other elastic elements being applied to the extreme end of the carrier arm is exerted with a certain mechanical advantage in sustaining the weight of the engine and controlling its vibrations. The brake lining or other friction material, while not preventing the normal slightly restrained vibrations of the engine owing to their small amplitude, will effectually dead beat excessive vibration which might occur at certain speeds when harmonic movements of the engine mechanism synchronize with the natural frequency of the total assembly of engine and elastic elements that float it.

As motor vehicles are subject to quite violent road shocks in ordinary driving, it is important to prevent the engine from responding fully to these occasional and rather violent forces. For this purpose the vibratory movements of the end portion 9 of the carrier are limited within a definite range which may be only slightly greater than the amplitude of the normal vibrations of the engine. In the embodiment shown, excessive vibrations are checked by buffers 20 and 21 located respectively above and below the spring bearing part 9 of the carrier arm and spaced equally on opposite sides of said part. These buffers may be tubular masses of rubber, or like yielding and elastic material, surrounding and frictionally engaging the bolt or pin 7. By reason of the presence of the buffers, normal vibrations of the engine are not interfered with, but excessive movement in the same directions due to exterior forces are prevented from occurring, the engine being held to the supporting frame except as is necessary to permit vibration incident to its normal operation.

In the slight modification of the front mounting illustrated in Fig. 5 the arm 4$^a$ is pivoted to an attached lug 15$^a$ rising from the cross bar 2$^a$. The boss 18 projecting from the front of the engine casing rests in a semi-circular bearing groove 16$^a$ in the upper side of the arm 4$^a$ upon a semi-cylindrical piece of brake lining or other suitable friction material 17$^a$. Another semi-cylindrical piece of brake lining rests on top of said boss 18 and is clamped thereto by the member 4$^b$ which has lugs 4$^c$ penetrated by bolts 4$^d$ threaded into the carrier arm 4$^a$; springs 4$^e$ interposed between the heads of the bolts and the lugs maintain a substantially constant pressure upon the brake lining. The bolts may be adjusted to regulate the pressure as desired.

One embodiment of the right hand rear mounting (looking from front to rear) is illustrated in Figs. 3 and 4. The engine may be provided with a laterally projecting bracket 30 and a shelf-like portion 31, the extremity of said bracket having projecting therefrom in a fore and aft direction a stud or trunnion 32. A carrier arm 33 provided with a bore 34 engages over said stud there being interposed between the stud and the inner wall of the bore a tubular piece of brake lining or other frictional material 35. A plate 36 rests against the end of said stud 32 and overlaps the face of the arm; spring 37 interposed between the plate 36 and the head of the bolt 38 provides the elastic pressure necessary. One end of arm 33 to the right of its pivotal connection to the engine as shown in Fig. 3 is pivoted to the sill 1 as by a bracket 39. At the end opposite the pivot the arm 33 has a spring bearing part 40 which is perforated to permit the passage of a bolt 41, said bolt having at its upper end a spring cap or abutment 42 which is adjustably held to the bolt as by nut 43. Surrounding the bolt are the elastic elements which floatingly sustain the weight of the engine and control its vibrations due to torque reaction. These elastic elements consist of a supporting spring 44 and an opposed spring 45, the spring 44 being interposed between the shelf 31 and under face of the part 40, while the upper spring is interposed between the spring cap 42 and the upper face of said part 40. Buffers 46 and 48 of the same character as the buffers shown in Figs. 1 and 5, surround the bolt, the ends adjacent the part 40 of the carrier arm being spaced therefrom an extent sufficient to permit the normal vibrations of the engine due to torque reaction but to restrain movements much in excess of the normal amplitude of said vibrations.

It will be observed that the rear mounting designed to insulate the frame from vibrations due to torque reaction has the elastic engine-floating elements reacting between the engine casing and the carrier arm, whereas in the embodiment illustrated to insulate the frame from the vibrations due to piston unbalance, the engine-floating elastic elements are interposed between the vehicle frame and the carrier arm. The illustrated differences in the mode of applying the elastic elements is merely a matter of convenience and choice.

Assuming the engine to be a four cylinder internal combustion engine of ordinary motor vehicle type, subject to vibrations in the plane of the cylinders due to piston unbalance and to oscillations around the crank shaft axis due to torque reaction, the normal operation of the engine will set up vibrations of small amplitude in the plane of the cylinder axes and about the crank shaft axis. As the front end of the engine is carried in the carrier arm 4 the vibrations of the engine will tend to oscillate the carrier arm in a short arc which practically coincides with the direction of vibration. The end of the arm being floated on the elastic element 5 opposed by the elastic element 13 will allow relatively free but slightly restrained normal vibrations, which are insulated from the frame. No lurching movements of the vehicle can displace the engine in a lateral plane, owing to the character of the connections of the arm 4 to the frame; the hinged arm preventing movements transverse of the frame and also movements fore and aft of the frame such as might be due to inertia when stopping or starting. Should resonance occur between some moving part or parts of the engine and the mass represented by the engine and the supporting elastic elements, the friction device interposed between the carrier arm and the boss on the engine casing engaged by it will absorb the energy of any excessive or augmented vibrations and damp them. Should the vehicle encounter rough places in the road tending to make the engine bounce violently, the buffers will hold the movements of the engine within limits not substantially greater than that due to the vibrations incident to normal operation.

The rear frame mounting will operate substantially in the manner described with respect to the front mounting. Slightly restrained normal vibrations due to torque reaction may take place, but the frame will be insulated with respect to them. Any excessive movements due to resonance at certain speeds will be damped by the energy absorbing device or frictional brake and excessive bouncing will be prevented by the buffers.

In operation, therefore, the engine may have a slightly restrained but relatively free vibration in a plane parallel with the cylinder axes and in a plane transverse of said first mentioned plane about the axis of the crank shaft, but it is restrained from movement in other planes and from movements in excess of those incident to the normal operation.

While I have illustrated and described specific engine mounts embodying the principles of my invention, in accordance with the requirements of the patent statutes, it is not intended that the invention shall be limited to the specific constructions shown, as the principles thereof may be applied in other specific forms.

What I claim and desire to secure by Letters Patent is:

1. The combination with an engine and a supporting base of elastic means interposed between the base and the engine permitting the engine to vibrate within limits through its normal position under the influence of forces incident to engine operation, and cushioning means operative to prevent vibrations substantially in excess of those incident to engine operation.

2. A combination as defined in claim 1, in which the cushioning means consists of yieldable buffers adapted to limits the amplitude of the vibrations permitted by the elastic means.

3. A combination as defined in claim 1 and in addition thereto, an energy absorbing means adapted to dampen vibrations of an amplitude in excess of those incident to engine operation.

4. The combination of an engine and a supporting base, of a carrier element attached to the engine, spring means resisting the movement of the carrier element in opposite directions and sustaining the weight of the engine, and buffers spaced from the carrier element sufficiently to permit the engine to vibrate under forces incident to engine operation but to prevent vibrations substantially in excess thereof.

5. A combination as defined in claim 4 in which said spring means are coil springs surrounding a pin having a spring abutment.

6. A combination as defined in claim 4, in which both the spring means and the buffers surround a pin provided with a spring abutment.

7. The combination of an engine, a supporting base therefore, elastic means adapted to sustain the weight of the engine but to permit it to vibrate in the plane of the cylinder axes under the influence of forces incident to engine operation, a boss projecting from the front of the engine casing and a carrier engaged by the boss and by said elastic means whereby the engine may move vertically and may rock about a longitudinal axis; a rear lateral sustaining element comprising elastic means adapted to permit the engine to vibrate about a fore and aft axis coaxial with said trunnion under the influence of forces incident to engine operation, and means to prevent movement of the engine in other directions.

8. The combination as defined in claim 7 with means tending to prevent vibrations of the engine in the permissible planes in substantial excess of those incident to operation.

9. In an engine mounting or the like, the combination with a supporting and a supported member, of an arm pivoted to the respective members, and resilient means bearing on said arm, floatingly suspending the weight of the supported member, to compensate for vibratory movements of the members.

10. In an engine mounting or the like the combination with a supporting member and a supported member, of a carrier arm pivoted to the respective members, resilient means engaging the arm to floatingly sustain the weight of the supported member but permit relative vibratory movement between the members and means to maintain the vibratory movement within a limited range.

11. In an engine mounting or the like, the combination of a supporting member and a supported member, of an arm on which the supported member rests, a pivotal connection on the supporting member about which the arm moves under vibration, a pin carried by one member extending through an opening in the end of the arm opposite said pivotal connection, buffers carried by the pin above and below the arm limiting the range of vibratory movement, and springs bearing on opposite sides of the arm yieldingly resisting the movement of the arm.

12. In an engine mounting or the like, the combination with a supporting member and a supported member, of an arm pivoted to both members, resilient means co-operating with the arm to floatingly suspend the arm and supported member in the normal gravitational position and energy absorbing means acting upon the arm and supported member to dampen excessive vibration of the supported member.

13. In an engine mounting or the like, the combination with a supporting member and a supported member, of a trunnion projecting from the supported member, a carrier for said trunnion, frictional bearing surfaces between the carrier and trunnion resisting relative movement, a pivotal connection between one end of the carrier and the supporting member, and an elastic connection between the other end of the carrier and one of the members whereby excessive vibrations of the supported member are damped by the friction bearing surfaces at the trunnion.

14. In an engine mounting or the like, the combination with a supporting member and a supported member, of an arm, a fixed pivotal connection on the supporting member at one end of the arm, a resilient supporting element at the opposite end of the arm, a trunnion carried by the supported member having pivotal connection with the arm to yieldingly suspend the supported member upon the supporting member, so that it may vibrate above and below the gravitational position of the member, and a friction element associated with the pivotal connection between the arm and trunnion to dampen excessive vibration.

15. In an engine mounting or the like, the combination with a supporting member and a supported member, of an arm pivoted at one end to the supporting member and at an intermediate point to the supported member, a resilient element yieldingly supporting the free end of the arm, whereby vibrations tend to move the arm about its respective pivotal points, a buffer associated with the resilient element limiting the range of vibratory movement and a friction element co-operating with one of the pivots to frictionally resist extended vibratory periods of large amplitude.

16. In an engine mounting or the like, the combination with a supporting member and a supported member, of a boss carried by the supported member, a carrier having a bearing groove in which the boss is pivoted, friction surfaces between the boss and bearing groove surface yielding pressure means maintaining the frictional surfaces in contact and automatically compensating for wear, whereby frictional resistance is offered to relative pivotal movement between the supported member and carrier, a pivotal connection for the carrier on the supporting member, and a resilient element yieldingly suspending the carrier to permit slight movement about its pivot.

In testimony whereof I affix my signature.

CALEB E. SUMMERS.